United States Patent [19]

Blake

[11] Patent Number: 4,679,714

[45] Date of Patent: Jul. 14, 1987

[54] UNIT DOSE LIQUID DISPENSER

[75] Inventor: William S. Blake, Linwood, N.J.

[73] Assignee: Realex Corporation, Kansas City, Mo.

[21] Appl. No.: 670,313

[22] Filed: Nov. 13, 1984

[51] Int. Cl.[4] ............................................. G01F 11/38
[52] U.S. Cl. ................................. 222/449; 222/453; 222/476
[58] Field of Search ............... 222/447, 449, 451, 453, 222/476

[56] References Cited

U.S. PATENT DOCUMENTS

| | | | |
|---|---|---|---|
| 345,112 | 7/1886 | Canan | 222/450 |
| 1,285,206 | 11/1918 | Johnson et al. | |
| 2,128,718 | 8/1938 | Strand et al. | 222/451 X |
| 2,343,847 | 3/1944 | Swann | |
| 2,530,012 | 11/1950 | Gronemeyer et al. | 222/449 |
| 2,620,113 | 12/1952 | Bodendoerfer et al. | 222/453 X |
| 3,091,374 | 5/1963 | Schwartzman | 222/448 |
| 3,141,585 | 7/1964 | Emmert | 222/434 |
| 3,232,498 | 2/1966 | Bennett | 222/449 |
| 4,109,829 | 8/1978 | Kuckens et al. | 222/453 X |
| 4,394,941 | 7/1983 | Recine | 222/449 X |

Primary Examiner—Charles A. Marmor
Attorney, Agent, or Firm—Schmidt, Johnson, Hovey & Williams

[57] ABSTRACT

The metering device is adapted to be installed on the neck of a liquid product container so that, when the container is upended or otherwise oriented to supply the device with liquid, actuation of the device results in the release of a pre-sized dose of the product by gravity. Several different embodiments of the invention are disclosed, all but one of which adapt the device for filling its dosage accumulation chamber when the device is in a standby condition ready for dispensing. The other embodiment adapts the device to maintain its dosage accumulation chamber normally empty and to fill such chamber only upon temporary actuation.

1 Claim, 11 Drawing Figures

UNIT DOSE LIQUID DISPENSER

TECHNICAL FIELD

This invention relates to liquid metering devices of the type which are attached to or installed upon liquid product containers to normally maintain the outlets of such containers closed during period of nonuse, but which, when actuated, are operable to dispense by gravity precise doses of the liquid contents.

BACKGROUND AND SUMMARY OF THE INVENTION

Although liquid metering and dosage devices are not new per se, none has heretofore been provided which is suitable for use in connection with the dispensing of household products such as liquid laundry detergent, for example, from relatively large containers.

Accordingly, one important object of the present invention is to provide a metering dosage dispenser which is quick, convenient, and easy to use and which is well-suited for use with liquid laundry detergents and other household liquid products wherein it is desired to dispense measured, uniform amounts of the product during each actuation.

In this respect, the present invention contemplates a metering device having one part which is tightly secured to the open neck of a container having product to be dispensed. This immovable part generally adapts a second movable part of the device for actuation between open and closed positions during which product is alternately dispensed from the container and accumulated in a dosage accumulation chamber. A convenient operating skirt is provided on the device which circumscribes the neck of the container and enables the user to open and close the device without contacting products issuing from the container. Because of the configuration of the actuating skirt and the nature of the stopper valve which forms a part of the device at the outlet end thereof, the device provides an aesthetically pleasing appearance comparable to that of a conventional closure cap. Moreover, the lack of extraneous projecting portions on the device facilitates safe shipment, handling and storage and reduces the chance of breakage of the preferably plastic-molded components which comprise the device.

In its preferred forms, the device is spring-biased to a position in which its inlet valve is open so as to admit contents of the container into the dosage accumulation chamber when the device is merely in a standby condition awaiting use. When the device is then intentionally actuated against the spring pressure, the inlet is closed and the outlet is opened so as to discharge the accumulated dose while preventing the formation of an open escape path for the remaining products in the interior of the container. Alternative spring configurations and locations are provided in connection with this approach.

An alternative embodiment of the invention spring-biases the device to a condition in which its inlet from the container is closed while its outlet for dosage discharge is open. Thus, upon user actuation, the device must first be shifted to a position opening the inlet of the dosage accumulation chamber and held in such a position for a short duration, whereupon release of the device enables the spring means to close the product inlet and open the outlet thereof for release of the accumulated dose.

DETAILED DESCRIPTION

Figure 5:
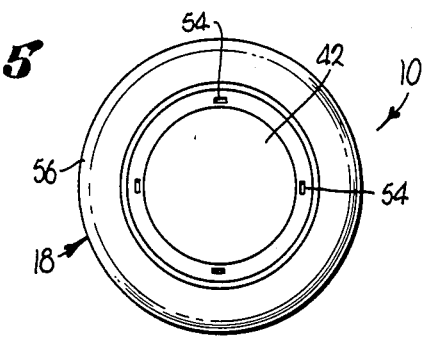
FIG. 5 is a top plan view of the device removed from a container.
Figure 1:
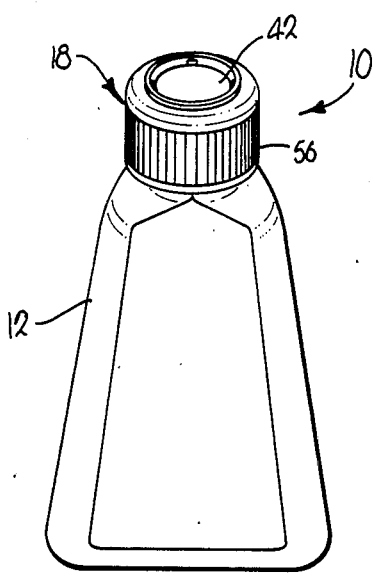
FIG. 1 is a front perspective view of a metering and dosage device constructed in accordance with the principles of the present invention and installed upon a suitable container.

The metering device 10 illustrated in FIGS. 1-4 is shown attached to a container 12 which may take the form of a lay down container as disclosed in U.S. Pat. No. Des. D-270,137, assigned to the assignee of the present invention. Although the device 10 is capable of functioning well with a variety of container shapes and sizes, a container as disclosed in said prior patent is particularly desirable because the container may be laid on its side and contents continuously supplied to the device 10 by gravity without the need for upending the container during each dispensing actuation. As will be appreciated, however, the principles involved in the present invention are not limited to a container of any particular configuration, and the illustration of the container 12 as one incorporating the patented design should not be considered limiting in any way to the scope of the present invention.

The device 10 includes two major components, i.e., a stationary, elongated, generally cylindrical body 14 which becomes secured to the neck 16 of container 12 to adapt or modify the latter for installation of the device 10, and a second generally elongated and cylindrical body 18 which is telescopically movable relative to body 14 between product filling and discharge positions.

The first body 14 has a main cylindrical portion 20 in the form of a continuous sidewall which is pressed tightly into the neck 16 for permanent installation. A concentrically disposed skirt portion 22 slips over the outside of the neck 16 and surrounds the latter, there being a web portion 24 interconnecting the cylindrical portion 20 with skirt portion 22 which limits the amount of insertion of cylindrical portion 20 into the neck 16. A bead 26 on the interior surface of skirt 22 snaps over a retaining lip 28 on the neck 16 when the body 14 is installed and thus resists any pull out or detachment of the body 14 from container 12. A vent 30 is provided in the web 24 for purposes which will be clearly understood by those skilled in the art.

The body 14 is provided with a closed transverse end wall 32 at its normally inner end and with one or more side entry ports 34 in the cylindrical portion 20. A pair of concentrically disposed, annular sealing ribs 36 and 38 are provided at radially spaced-apart locations on the interior surface of the end wall 32 for a purpose which will subsequently be described.

A long, centrally disposed stem 40 integral with the end wall 32 projects therefrom toward and beyond the opposite end of the cylindrical portion 20 where it supports a generally truncated cone-like stopper 42. The stopper 42 is preferably molded as a separate part from the body 14 and may be advantageously snapped in place onto the stem 40 after the device 10 has been fully assembled. The stopper 42 has a dished external face as well as a converging interior sealing surface 42a.

The second body 18 likewise includes a main cylindrical portion 44 telescopically received within the cylindrical portion 20 of body 14. A dosage accumulation chamber 46 is defined within the cylindrical portion 44 between the latter and a centrally disposed sleeve 48 which slidably receives the stem 40. A coil spring 50 encircles the stem 40 and is trapped between the end wall 32 of body 14 on the one hand and a converging shoulder portion 48a of sleeve 48 on the other hand so as to yieldably bias the second body 18 telescopically outwardly for engaging a dished valve seat 52 on the outer end of body 18 with the sealing surface 42a of stopper 42. The stopper 42 and the seat 52 thus cooperate to form what may be broadly termed as an outlet valve 53 for the device 10. A vent 54 is also provided in the sealing surface 52.

The body 18 also includes an exterior skirt 56 which is spaced radially outwardly from the accumulation chamber 46 and which circumscribes both the skirt 22 of body 14 and the underlying portion of neck 16. An annular bead 58 on the interior surface of the skirt 56 cooperates with a corresponding annular bead 60 on the exterior surface of the body 14 whereby to limit the extent of telescopic, outwardly directed movement of the body 18 relative to the body 14. An intermediate web portion 62 between skirt 56 and cylindrical portion 44 has a depending, concentrically disposed, annular boss 64 spaced from the vent 30 when body 18 is in its chamber-filling position of FIG. 2 and disposed to make sealing engagement with the vent 30 when the body 18 is in its product-discharge position of FIG. 3.

Figure 2:
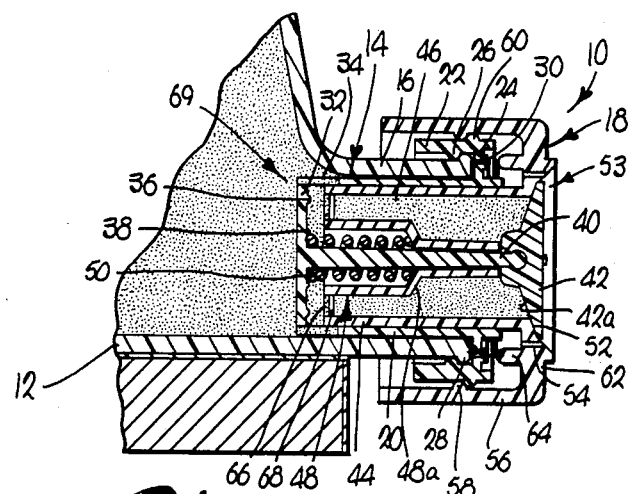
FIG. 2 is an enlarged, fragmentary cross-sectional view thereof showing the container in its laid down position with the dispensing device in its standby position allowing product to fill the dosage accumulation chamber thereof.
Figure 3:
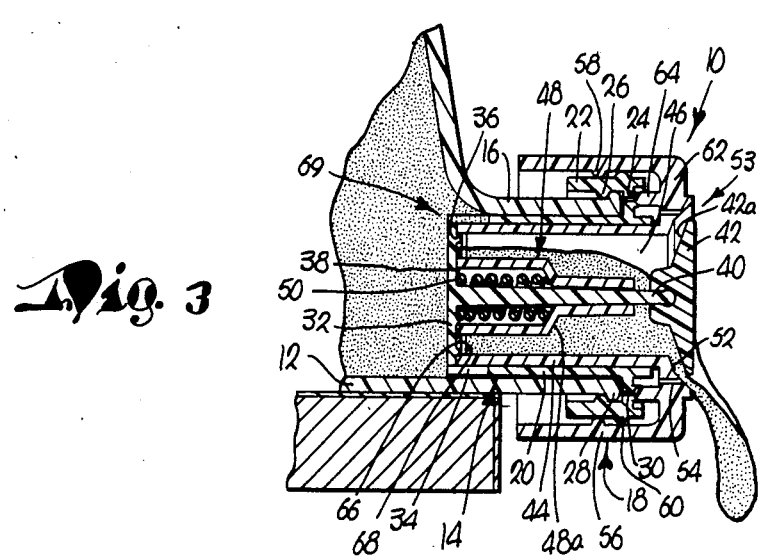
FIG. 3 is a view similar to FIG. 2 but showing the dispensing device in an actuated position for product discharge.

At its inner end the cylindrical portion 44 is provided with inlet apertures 66 formed by a series of recessed, spoke-like ribs 68 joining the sleeve 48 with the cylindrical wall portion 44. When the part 18 is in its filling position as illustrated in FIG. 2, the port 34 is opened by the cylindrical sidewall 44 and the apertures 66 are spaced axially from the end wall 32 such that communication is established between the interior of the container 12 and the accumulation chamber 46. On the other hand, when the body 18 is positioned in its discharge position as illustrated in FIG. 3, the inner end of the cylindrical sidewall 44 closes the ports 34 and the end wall 32 closes the apertures 66 whereby to prevent communication between the interior of the container 12 and the accumulation chamber 46. The sealing ribs 36, 38 tightly engage proximal inner edge extremities of the wall portion 44 and sleeve 48 at such time to further seal the chamber 46 from the interior of the container 12. Broadly speaking, the ports 34, the inner end portion of the cylindrical wall 44, and end wall 32, and the apertures 66 may be collectively referred to as an inlet valve 69 for device 10.

Figure 4:
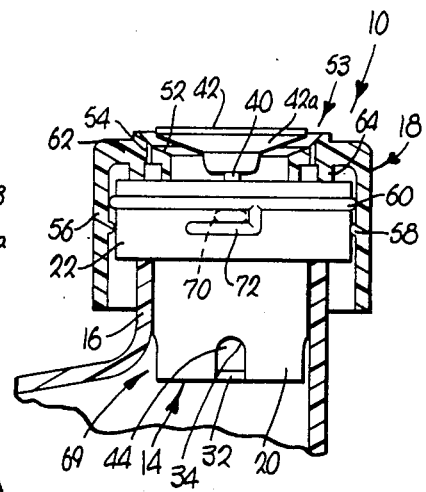
FIG. 4 is a fragmentary detail view of the device with parts shown in cross-section and in elevation to best reveal details of construction, including a means for locking the device in an unactuatable position for shipment and storage.

FIG. 4 illustrates a suggested manner of locking the device 10 for shipment purposes, which arrangement may or may not be used in connection with the alternative embodiments hereinafter described, at the manufacturer's discretion. In this respect, although the body 18 is shown in a retracted position opening the outlet means, there is a phantom showing of a locking lug 70 which could comprise the same structural part as the bead 58 on body 18, or an entirely separate part as may be desired. In any event, when the body 18 is fully telescoped outwardly, it may be rotated to bring the lug 70 into trappinng position between the external bead 60 on body 14 on the one hand and a relatively short, axially-spaced locking bead 72 on the other hand. With the lug 70 captivated between the beads 60 and 72, the outer body 18 cannot shift in either axial direction, thereby locking the device 10 with the stopper 42 pressed against the seat 52. In order to unlock device 10, it is only necessary then to rotate the outer body 18 sufficiently to disengage the lug 70 from between the beads 60 and 72.

In use the container 12 is preferably laid on its side as illustrated in the figures, causing the contents to be gravitationally directed toward the neck 16 of the container 12. With the device maintained in its filling position as illustrated in FIG. 2, the inlet valve 69 is open so that product may enter and fill the chamber 46. However, because the outlet valve 53 is closed at this time by the stopper 42 bearing against seat 52, no product can escape from the chamber 46.

The user then grasps the skirt 56 of the body 18 and shifts the latter inwardly toward the container in a linear, axial motion until the inner end of the cylindrical portion 44 of body 18 bottoms out against the end wall 32 of body 14, thereby opening the outlet valve 53 and closing the inlet valve 69. This condition is illustrated in FIG. 3 wherein it may be seen that such action allows the contents of the chamber 46 to be dispensed through the outlet valve 53 and in an amount that corresponds precisely to the interior dimensions of the chamber 46. Consequently, by carefully predetermining the interior dimensions of the chamber 46, the amount of dosage to be dispensed from the device 10 during each actuation thereof can likewise be controlled such that repeated actuations will result in the precision dispensing of uniform doses.

Release of the skirt 18 by the user then permits the return spring 50 to telescope the outer member 18 back outwardly to its filling position of FIG. 2, once again opening the inlet valve 69 and closing the outlet valve 53 so that the chamber 46 may again be refilled with product in readiness for the next actuation of the body 18.

EMBODIMENT OF FIGS. 6 AND 7

Figure 6:
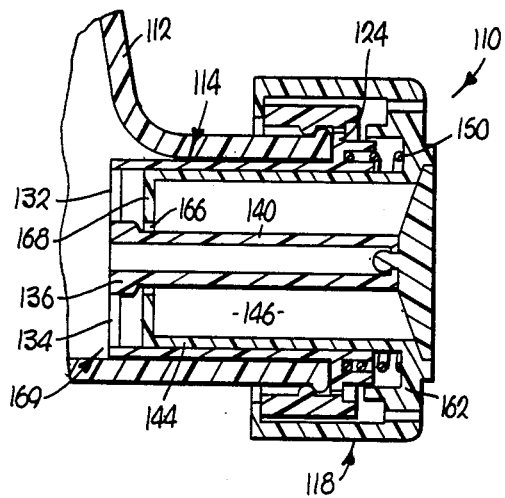
FIG. 6 is a fragmentary cross-sectional view of a second embodiment of metering device in accordance with the present invention installed on a suitable container and with the device illustrated in its closed condition.
Figure 7:
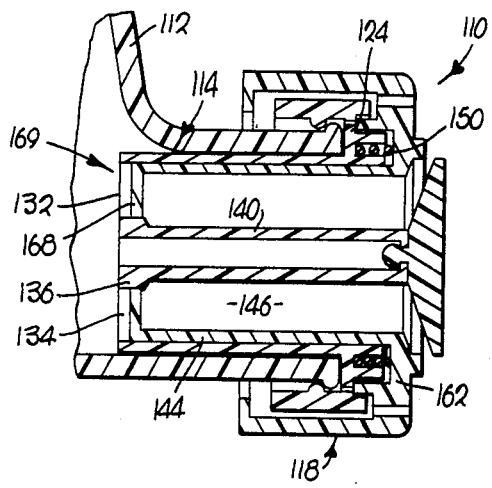
FIG. 7 is a view similar to FIG. 6 of the second embodiment illustrating the device in its actuated or open position.

The device 110 of FIGS. 6 and 7 is similar in many respects to the embodiment of FIGS. 1-5. Accordingly, only those areas where significant structural differences exist will be elaborated upon. Furthermore, as will be appreciated from the following description, the device 110 functions in substantially the same way as the device 10 to accumulate a dosage of predetermined size when the device 110 is in a standby condition, and then to dispense such dosage when actuated while, at the same time, precluding the simultaneous entry of additional liquid into the accumulation chamber.

With this in mind, then, suffice it to point out that the inner body 114 of device 110 has its inlet ports 134 located in the end wall 132 thereof, rather than in the cylindrical sidewall 144. Instead of spoke-like ribs, the inner end of the outer body 118 has an end wall 168 which is closed except for a central aperture 166 which receives the centrally disposed stem 140 projecting axially from the end wall 132 toward the opposite end of the device 110. An enlargement 136 at the base of the stem 140 is adapted to slip sealingly into the aperture 166 when the body 118 is fully retracted as in FIG. 7, thereby closing the inlet valve 169 and terminating communication between the accumulating chamber 146 and the interior of the container 112.

A relatively large diameter coil spring 150 is trapped between the intermediate portion 124 of the first body 114 on the one hand and the intermediate portion 162 of the second body 118 on the other hand whereby to yieldably bias the second body 118 toward its filling position of FIG. 6.

EMBODIMENT OF FIGS. 8 AND 9

Figure 8:
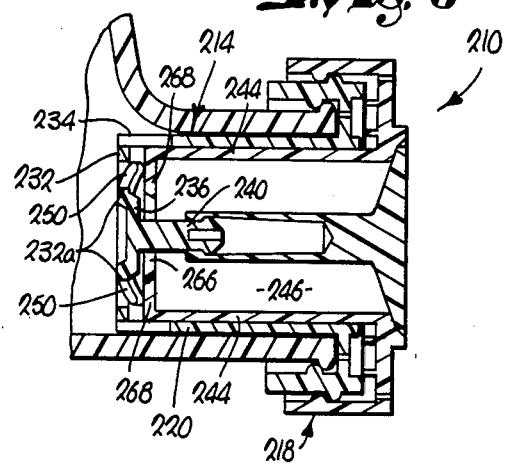
FIG. 8 is a fragmentary cross-sectional view of a third embodiment of the present invention showing the same installed upon a suitable container with the device in a closed position.
Figure 9:
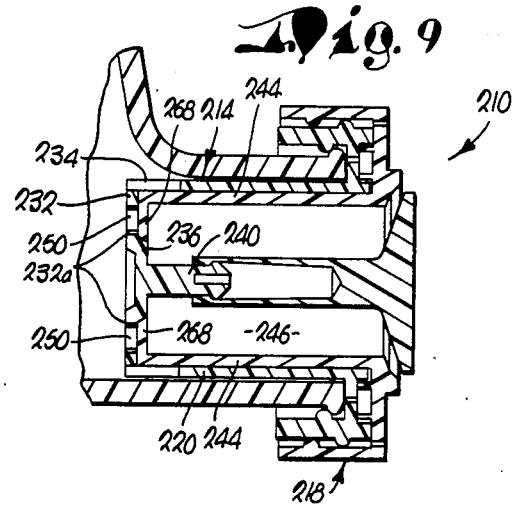
FIG. 9 is a view similar to FIG. 8 of the third embodiment but showing the device in an open condition.

The device 210 of FIGS. 8 and 9 is closely similar in construction and operation to the embodiment of FIGS. 6 and 7, the differences residing primarily in the nature and construction of the spring means utilized to bias the device toward a closed condition precluding product discharge. In this respect, it will be noted that the end wall 232 of the first body 214 is provided with a plurality of resilient spring levers 250 which are integral with the end wall 232 but are molded in such a way as to be effectively separated therefrom at all extremities except an end, connecting extremity thereof. Thus, the spring levers 232 are essentially cantilever secured to the end wall 232 and are adapted to flex from a raised position as illustrated in FIG. 8 down into receiving sockets 232a corresponding in shape thereto. The spring levers 250 bear against the end wall 268 of the inner cylindrical portion 244 of second body 218 so as to yieldably bias the latter toward the filling position thereof as illustrated in FIG. 8.

As in the embodiment of FIGS. 6 and 7, the device 210 includes an enlargement 236 at the base of the stem 240 which is sealingly receivable within a centrally disposed aperture 266 in the end wall 268 of cylindrical portion 244, controlling the admittance of product into the accumulation chamber 246. Side entry ports 234 in the cylindrical portion 220 of the first body 214 adjacent the inner end thereof are opened and closed by proximal portions of the cylindrical wall 244 of second body 218.

EMBODIMENT OF FIGS. 10 AND 11

Figure 10:
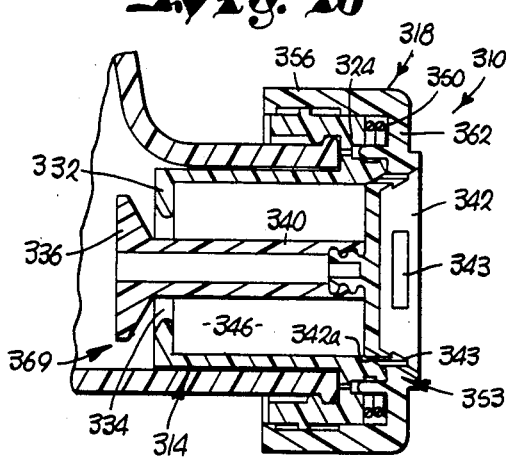
FIG. 10 is a fragmentary cross-sectional view of a fourth embodiment of the device attached to a container with the device held in a closed position against the urging of the spring-biasing means thereof.
Figure 11:
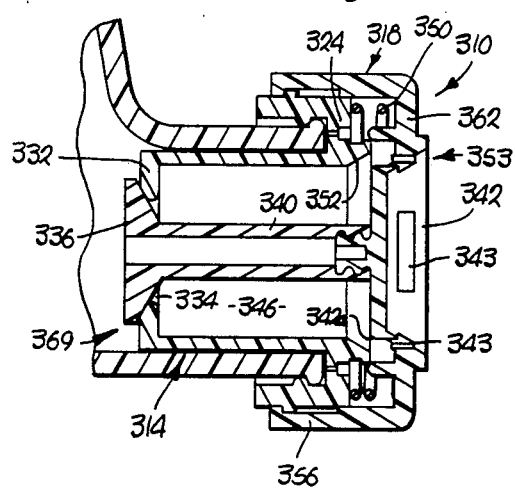
FIG. 11 is a view of the device similar to that illustrated in FIG. 10 with the device shown in its open, product discharging position.

The device 310 of FIGS. 10 and 11 is generally similar to the devices 10, 110, and 210, yet is also different in certain specific respects. Such differences will be described in detail as follows.

Unlike the first three embodiments, the first body 314 of device 310 is not provided with a centrally disposed, stationary stem. Instead, the stem 340 of the device 310 is secured to and made a part of the second body 318 for reciprocating axial movement with the latter. In this respect, the stem 340 is secured to and projects inwardly from the underside of the stopper 342, which is also secured at its periphery to the second body 318 rather than to the first body 314. The stopper 342 is attached to the intermediate portion 362 of the body 318 at spaced intervals so as to define a plurality of circumferentialy disposed outlet openings 343. Such openings 343 are closed by engagement of the underside 342a of the stopper 342 with a beveled seat 352 on the outer end of the inner body 314 when the outer body 318 is in a fully retracted position as illustrated in FIG. 10. Note in this respect that the coil spring 350 trapped between the intermediate portion 324 of inner body 314 on the one hand and the intermediate portion 362 of the outer body 318 on the other hand yieldably biases the outer body 318 to its outwardly telescoped position of FIG. 11, at which time the openings 343 are open. Consequently, in contract to the devices 10, 110, and 210, the device 310 is normally biased open, rather than closed.

The transverse end wall 332 of the inner end of the first body 314 is provided with a centrally disposed port 334 which receives the stem 340 and is opened and closed by an enlargement 336 on the innermost end of stem 340. As clearly shown, the stem 340 projects entirely through the port 334 such that the enlargement 336 is effective to close off the port 334 from the inner extremities thereof, coinciding with the condition illustrated in FIG. 11 at which time the stopper 342 is spaced outwardly from the seat 352.

As above noted, there are two primary differences between the device 310 and those of the other three embodiments. First, the device 310 has a stopper 342 which is carried by and movable with the second body 318, rather than being stationary.

Secondly, the device 310 is yieldably biased by the spring 350 into a normally open or discharging condition, instead of a normally filling condition. Consequently, in use of the device 310, the user grasps the actuating skirt 356, shifts the body 318 inwardly to its fully retracted position of FIG. 10 and momentarily holds the same in that position as the dosage accumulating chamber 346 fills with liquid. Thereafter, the user may simply allow the spring 350 to urge the second body 318 back to its telescoped, outer position of FIG. 11, closing the inlet valve 369 associated with enlargement 336 and aperture 334 and opening the outlet valve 353 associated with the stopper 342 and seat 352, thus discharging the contents of chamber 346.

I claim:

1. A metering device for use in dispensing successive, equal-size doses of liquid product from the neck of a container on which the device is mounted, said device comprising:

a first body adapted to be immovably received within the neck of the container;

a second body telescopically coupled with said first body for alternate disposition in a filling position and an axially shifted discharge position, said bodies cooperating to define a dosage accumulation chamber fillable during disposition of the second body in said filling position and dischargeable during placement of the second body in said discharge position, said bodies having an inlet valve at a normally inner end thereof adapted to open when said second body is in said filling position and close when the second body is in said discharge position, said bodies further having an outlet valve at a normally outer end thereof adapted to open when said second body is in said discharge position and close when the second body is in said filling position, said second body having an externally disposed, manually actuatable skirt spaced radially outwardly from said chamber for manipulation by a user in moving the second body between said filling and discharge positions thereof; and means for yieldably biasing said second body toward one of said positions thereof, said outlet valve including an annular seat on one of said bodies and a stopper on the other of said bodies having an annular surface sealingly engaging said seat when the second body is in said filling position and axially spaced from said seat when the second body is in said discharging position, said stopper being on said first body and said seat being on the second body, said first body being provided with a normally inner end having a centrally disposed stem projecting axially therefrom in the direction of said outlet valve, said stopper being carried by said stem at a termination thereof remote from said inner end of the first body, said second body being provided with a normally inner end having a centrally disposed sleeve projecting axially therefrom in reciprocable, surrounding relationship to said stem, said stem having a coil spring encircling the same within said sleeve and trapped between a shoulder on said sleeve and means on said first body for yieldably biasing the second body toward said filling position.

* * * * *